United States Patent

[11] 3,587,078

| [72] | Inventors | Dieter Eichmann;<br>Georg Russ, Erlangen, both of, Germany |
|---|---|---|
| [21] | Appl. No. | 725,002 |
| [22] | Filed | Apr. 29, 1968 |
| [45] | Patented | June 22, 1971 |
| [73] | Assignee | Siemens Aktiengesellschaft, Berlin and Munich, Germany |
| [32] | Priority | June 19, 1967 |
| [33] | | Germany |
| [31] | | S110 448 |

[54] LIMIT SENSOR DEVICE
8 Claims, 4 Drawing Figs.

[52] U.S. Cl. .................................................. 340/227,
307/235, 340/248
[51] Int. Cl. ......................................................... G08b 17/00,
G08b 21/00, H03r 5/153
[50] Field of Search........................................... 340/233,
228, 227, 248 A, 248 C, 248 P, 172; 307/235;
328/148; 324/133

[56] References Cited
UNITED STATES PATENTS

| 3,120,663 | 2/1964 | Beaman et al. ............... | 340/248 A X |
| 3,122,729 | 2/1964 | Bothwell et al. ............... | 340/248 A |
| 3,159,825 | 12/1964 | Bianchi et al. ................. | 340/248 A |
| 3,304,441 | 2/1967 | Pelt ................................ | 340/233 X |
| 3,341,816 | 9/1967 | Davis et al. .................... | 340/248 A X |
| 3,454,787 | 7/1969 | Gelernter ....................... | 340/248 A X |
| 3,454,925 | 7/1969 | Ruof .............................. | 340/227 X |
| 3,492,589 | 1/1970 | Rotier ............................ | 328/148 X |

*Primary Examiner*—John W. Caldwell
*Assistant Examiner*—Scott F. Partridge
*Attorneys*—Curt M. Avery, Arthur E. Wilfond, Herbert L. Lerner and Daniel J. Tick ABSTRACT: A device for response to two limit values of an electrical voltage or current indicative of a variable physical quantity comprises a flip-flop amplifier which receives as input quantities not only the sensed electrical quantity but also an additional periodic pulse. A coincidence gate network connected to the amplifier output and to the pulse source provides a gate output voltage dependent upon the operating state which the flip-flop amplifier exhibits during the pulses and pauses of the periodic input pulse. The gate output voltage is indicative of whether or not the variable quantity being supervised has attained either of the two limit values.

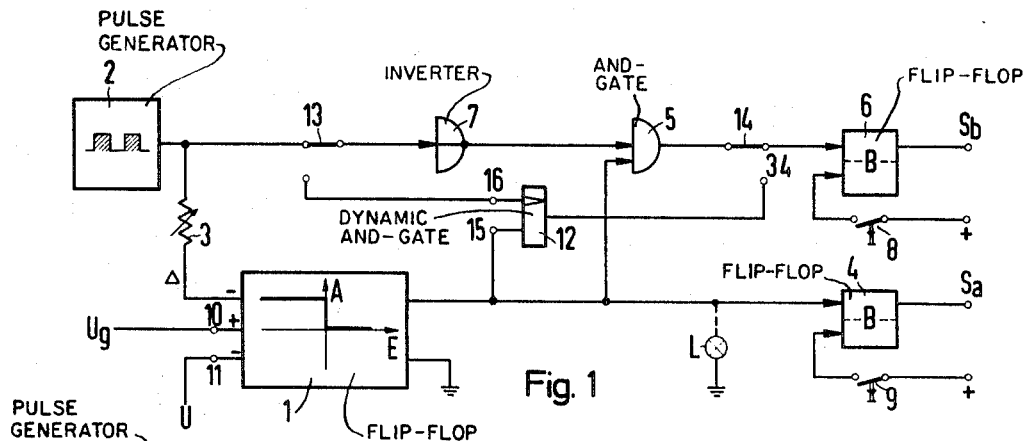
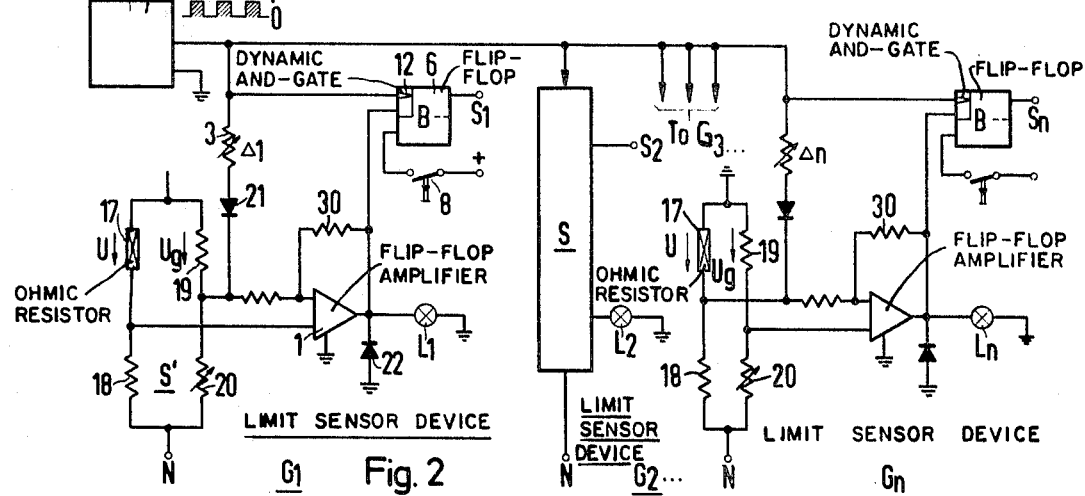
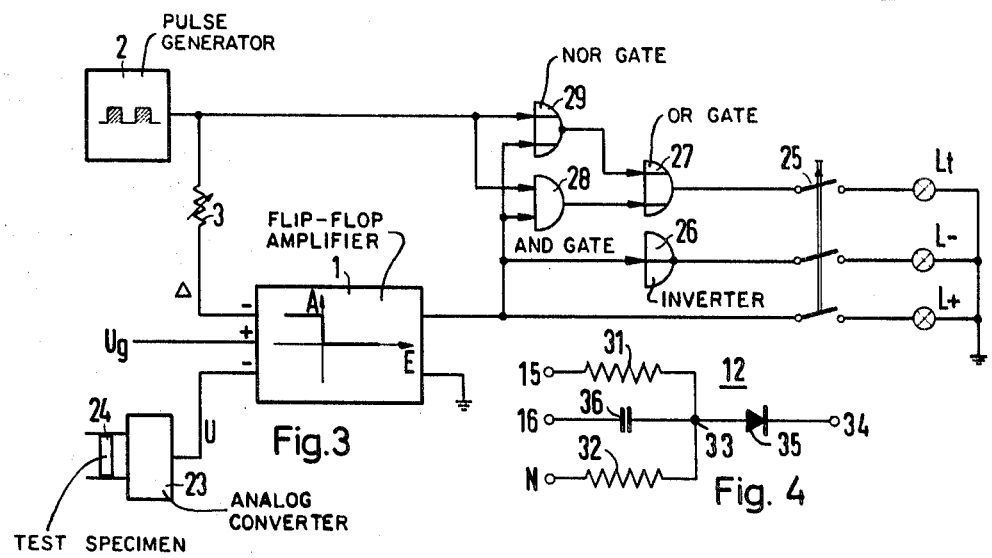

LIMIT SENSOR DEVICE

Our invention relates to devices for sensing two limit values of a physical magnitude represented by a variable electrical quantity, usually a voltage or a current.

For response to, or indication of, discrete values of a given physical quantity it has been customary to convert this quantity to an analog electrical voltage or current and to provide a particularly adjusted limit sensor for each of the discrete values. If the limit values to be adjusted are rather close to each other, or if exacting accuracy requirements are to be met by the sensing operation, the limit sensors must satisfy correspondingly strict conditions as regards relative and absolute constructional tolerances. This places severe demands upon manufacturing facilities and cost, especially if a multiplicity of measuring quantities is to be supervised with respect to two limit values.

It is an object of the invention to minimize such demands without impairing the accuracy of the desired limit-sensing response of the sensing apparatus.

Another conjoint object of our invention is to provide for response to two freely selective limit values of the quantity being supervised or responded to, while requiring for this purpose a single limit sensor only.

To this end and in accordance with our invention we provide a sensing device for response to two limit values of an electrical voltage or current indicative of a variable physical quantity, with an electrical flip-flop amplifier which, aside from receiving as input quantity the variable electrical magnitude being responded to, is supplied with an additional periodic input quantity with given durations of its pulses and pauses. A gate network connected to the output of the flip-flop amplifier and to the source of the periodic pulses, furnishes a gate output voltage for checking the operating condition of the flip-flop amplifier resulting from the two input quantities during the duration of the pulses and pauses of the additional periodic input quantity. This feature of the invention is tantamount to periodically displacing the responding threshold of one and the same flip-flop amplifier by means of an additional feeder input, and calling upon the amplifier output in synchronism with the periodic feeder voltage in order to ascertain the resulting state of the flip-flop amplifier.

The periodic quantity additionally applied to the input of the flip-flop amplifier can be supplied in a simple manner through an adjustable resistor energized by the output voltage of a pulse generator which also supplies the synchronizing pulses to the gate network. The amplitude of the current flowing through this resistor then corresponds to the spacing between the two limit values being supervised and hence to the difference between the two response thresholds of the limit sensing device.

The gate network in a device according to the invention may be formed with the aid of electromagnetic relay components. However, for increasing the operational reliability as well as the speed of response, it is preferable to employ solid-state logic components rather than mechanical switching contacts. According to another feature of our invention, this is done for example, by providing the gate network at its input side with an inverter gate which is connected between the output of the pulse generator and one of two inputs of an AND gate whose other input receives output voltage from the flip-flop amplifier.

It may be observed in some cases that differences in signal traveling time may detrimentally affect the operation of the flip-flop amplifier and the gate network. According to a further feature of our invention, such detrimental effects are obviated by connecting the output of the flip-flop amplifier to the preparatory input of a dynamic AND gate whose trigger input is impressed by the periodic voltage furnished from the pulse generator. This design of the gate network prevents faulty operation of indication of the limit-value sensor device according to the invention.

In plants or systems in which several measuring quantities are to be supervised with the aid of a corresponding multiplicity of devices according to the invention, it is preferable to provide a single pulse generator which is common to all of the flip-flop amplifiers and gate networks of the devices.

It has been found advisable in some plants to visually exhibit the occurrence of at least one limit value by flicker-light indication exclusively or additionally. For this purpose, a special flicker-light generator has been provided in known plants in order to produce a pulsating feeder current for the indicator lamps. Relative to such plants, it is a further object of our invention to afford a considerable simplification.

To this end the above-mentioned pulse generator for providing the synchronizing or clock pulse to the flip-flop amplifier and gate network of the sensor device is rated for the flicker-light frequency, and the flickering indicator lamps are connected to the output of the flip-flop amplifier or amplifiers. As a result, a separate flicker-light generator becomes unnecessary, or the flicker-light generator that may be available in a plant can also be used for operating the limit-value sensor device according to the invention. A further advantage in such plants is the fact that the amplifier means usually required for amplifying the current of the flicker-light generator can be omitted since its purpose is additionally served by the flip-flop amplifier of the limit-value sensing device according to the invention.

The invention will be further described with reference to embodiments of sensor devices according to the invention illustrated by way of example in the accompanying drawing in which:

FIG. 1 is a schematic diagram of a first embodiment;

FIG. 2 is a more detailed diagram of a system according to the invention suitable for supervision of temperature at several measuring locations;

FIG. 3 is a schematic diagram of a device according to the invention suitable for tolerance testing of mass-production specimens; and FIG. 4 is a circuit diagram of a dynamic AND gate applicable in devices according to FIGS. 1, 2 and 3.

The same reference characters are used in all of the illustrations for corresponding components respectively.

Referring to FIG. 1, there is shown at 1 the block diagram of a flip-flop amplifier whose static characteristic is indicated on the block symbol by the course of its output magnitude A versus input magnitude E. That is, the abscissa may denote input voltage or current E, and the ordinate output voltage or current A. The input quantity being supervised is assumed to be a variable direct voltage U which is impressed upon an input terminal 11 of the amplifier. Another but constant direct voltage $U_o$ is applied to a second input terminal 10 of the amplifier in order to determine the upper limit value for the sensor device. An additional periodic input voltage is supplied to the amplifier input from a pulse generator 2 through an adjustable resistor 3. The periodic voltage is shown on the generator block symbol 2 as a rectangular wave of given pulse duration and a given duration of the interpulse pauses. During the pauses, that is while the periodic additional voltage has the amplitude zero, the output voltage of the flip-flop amplifier 1 differs from zero only if the sum of its input quantities is negative, that is only if $U > U_o$. For the duration of each individual pulse, however, when the adjustable resistor 3 is impressed by voltage from the pulse generator 2, the input circuit of the amplifier 1 receives the additional voltage magnitude $\Delta$ which has the same (negative) polarity as the variable voltage U being supervised. Since this polarity is opposed to the (positive) polarity of the constant voltage $U_o$, the threshold of response is reduced by the magnitudes $\Delta$. Consequently, for this interval of time the flip-flop amplifier will already furnish an output signal if the measured quantity U has just passed above a lower limit value amounting to $U_o - \Delta$.

The output of the flip-flop amplifier 1 is connected directly with one of the two inputs of a bistable flip-flop stage 4 and also through an AND gate 5 with one of the inputs of a second bistable flip-flop stage 6. The second input of the AND gate 5 is connected with the output of the pulse generator 2 through an inverter gate 7. Due to the inverter gate 7, an output signal of the flip-flop amplifier 1 that differs from zero can pass through the AND gate during only the pauses between the pulses furnished from the generator 2, that is only during the intervals in which the additional feed Δ is absent. The combination of gates 7 and 5 thus operates as a gate network which for the pulse duration of the additional feed Δ keeps the input of the bistable flip-flop 6 isolated from any output signal of the flip-flop amplifier 1 as might otherwise cause switching of the flip-flop 6.

The device so far described will exhibit the following three typical states of operation:

(1) When the variable measuring voltage U is below the lower limit value $U_o-\Delta$, the amplifier does not at any moment furnish an output signal.

(2) When the measuring quantity U is between the above-mentioned lower limit $U_o-\Delta$ and the upper limit $U_o$, the amplifier output furnishes a pulse signal during the periodic intervals in which the periodic feed quantity Δ is additionally supplied, this amplifier output signal being kept away from the input of the bistable flip-flop 6. However, the first occurrence of this signal controls the bistable flip-flop 4 to switch to the state in which the output terminal $S_a$ furnishes a signal. This signal is available, for example, as a warning indicative of the fact that the measuring quantity U has approached the permissible maximal limit value $U_o$ except for the remaining value Δ. As shown in FIG. 1, the warning can be visually indicated by connecting a lamp L to the amplifier output. This lamp will then produce a flicker light if the pulse sequence frequency of the generator 2 is correspondingly chosen.

(3) When the measuring value U exceeds the upper limit value $U_o$, the bistable flip-flop 6 responds and furnishes a signal at its output terminal $S_b$. This signal may be employed for controlling a regulating action that reduces the measuring quantity U with the aid of a suitable control system (not illustrated). The bistable flip-flop stages 6 and 4 of the limit value sensor device can be reset by actuation of clearance keys 8 and 9.

As long as the measuring quantity U is in the range between the two limit values $U_o-\Delta$ and $U_o$, the output voltages of the inverter gate 7 and of the flip-flop amplifier 1 should always vary in synchronism with each other in such a sense that a signal differing from zero at the output of the flip-flop amplifier 1 causes the output of the inverter 7 to furnish a signal which blocks the AND gate 5. Obviously, this condition is satisfied if the respective signal travel times in the flip-flop amplifier 1 and in the inverter 7 are equal, but if these travel times differ from each other, a faulty behavior of the limit sensor device may result.

To prevent such trouble, the inverter gate 7 and the AND gate 5 can be substituted by a dynamic AND gate 12. This is done by placing two switching bridges 13 and 14 into their respective vertical positions. The preparatory input 15 of the dynamic AND gate 12 is then connected to the output of the flip-flop amplifier 1, and the trigger input 16 of the gate 12 is connected with the output of the pulse generator 2. A dynamic gate is essentially a gate network that includes a timing circuit such as a capacitor circuit so that a signal applied to its preparatory input will keep the gate in condition for subsequent opening even after the input pulse at this input has ceased, provided the timing interval has not yet elapsed. While an example of such a dynamic gate network will be more fully described hereinafter with reference to FIG. 4, it will presently suffice in conjunction with FiG. 1 to realize that a signal change of the pulse generator 2 which releases the occurrence of the additional magnitude Δ will pass through the dynamic AND gate 12 and hence may switch the bistable flip-flop 6 only under the condition that a signal different from zero is either simultaneously impressed upon the preparatory input 15 or has been placed upon this input within a given antecedent interval of time determined by the time constant of the gate. Consequently if the measured quantity U varies in the range between the two limit values, and the output magnitude of the flip-flop amplifier changes its signal state simultaneously with or later than the pulse generator voltage, the dynamic gate 12 will prevent the input of the flip-flop 6 from receiving a switching signal. On the other hand, when the measuring quantity has exceeded the upper limit value so that a continuous signal appears at the output of the flip-flop amplifier 1, a switching signal will reach the bistable flip-flop 6 at the moment of the next following signal change of the pulse generator voltage.

The two limit values $U_o$ and $U_o-\Delta$ can be adjusted within a wide range, independently of each other and with great accuracy. It is simple to have the two limit values approach each other very closely to any desired extent by correspondingly increasing the resistance of the adjustable resistor 3 and thereby reducing the additional fee voltage amplitude Δ. When using two separate limit sensing devices in lieu of only a single device according to the present invention, a minimal spacing between the two limit values would require additional and careful consideration of the relative tolerances with respect to construction and circuitry of the two sensor devices.

A device as exemplified by FIG. 1, therefore, is particularly well suitable for response to maximum values. However, if the device is to respond to a quantity declining below limit values, as is needed for the sensing of minimal values, the operational direction of the magnitude U and of the limit value $U_o$ is to be reversed. In other words, in the latter case the measuring quantity U would have to be impressed upon the terminal 10 and the limit value $U_o$ upon the terminal 11. The operation then results analogously to the one described in the foregoing.

The system of devices illustrated in FIG. 2 serves to supervise a multiplicity of measuring quantities, such as temperatures within a large industrial plant. The system comprises a number of n limit sensor devices each being fundamentally designed like the one described above with reference to FiG. 1, although only three of the devices $G_1$, $G_2$, $G_n$ are shown in FIG. 2. The sensing circuitry and the appertaining amplifier and gate circuitry is illustrated only for the devices $G_1$ and $G_n$, the corresponding subsystem $G_2$ being shown only by a block symbol S. While the devices are each equipped with their own flip-flop amplifier 1 and their own sensing network S and gate network, all of the sensor devices have a single pulse generator 2 in common, this generator furnishing a rectangular pulse voltage having the polarity indicated.

The limit sensor device $G_1$ is designed for supervising a maximal temperature. Its sensing network S' proper comprises a bridge arrangement whose four branches contain ohmic resistors 17, 18, 19 and 20. The resistor 17 is temperature responsive and has a positive temperature coefficient. This resistor 17 consists, for example, of platinum wire. The bridge network is fed with constant voltage from a supply line or other source connected at N. The resistor 20 in one of the bridge branches is adjustable and permits setting the upper limit value $U_o$ by determining the voltage drop at the variable resistor 19 for which the bridge becomes balanced. The temperature responsive resistor 17 is placed in thermal contact with the measuring locality so that the voltage U of resistor 17 is an analog image of the temperature to be supervised. The bridge diagonal voltage or bridge output voltage, therefore, constitutes the difference between the upper limit value $U_o$ and the sensed quantity U. This difference voltage is impressed upon the input circuit of the flip-flop amplifier 1.

The pulse generator 2, furnishing a periodic voltage whose amplitude changes between zero and a positive potential, feeds an additional current through the adjustable resistor 3 and a decoupling diode 21 to the input circuit of the amplifier 1, this current being directed toward reducing the effect of the voltage $U_o$. The flip-flop amplifier 1 is a supercritically feedback coupled direct-current amplifier, such as a conventional direct-current differential amplifier whose flip-flop behavior is due to a positive feedback which, as indicated in FIG. 2, connects the amplifier output to the input through a resistor 30.

The output voltage is downwardly limited by a diode 22 to zero i.e. ground potential. The output of the amplifier 1 is connected to a warning lamp $L_1$ and to the preparatory input of a dynamic AND gate 12. As illustrated, the AND gate may be combined with the bistable flip-flop 6 to form a single circuit component together therewith. The output voltage of the pulse generator 2 is supplied to the trigger input of the AND gate 12.

If during the pauses of the generator pulse in which the additional feed amplitude $\Delta_1$ is absent, the temperature of the measuring locality being supervised is below the upper limit value, the voltage U is lower than the voltage $U_o$ at the bridge resistor 19, the output voltage of the flip-flop amplifier 1 is at zero (ground) potential. When the voltage drop U of the temperature-responsive resistor 17 exceeds the value of the maximal limit $U_o$, the signal $S_1$ appears at the output of the bistable flip-flop stage 6 in analogy to the performance described above with reference to FIG. 1; and a permanent light is exhibited by the lamp $L_1$. The additional periodic magnitude $\Delta_1$ from the pulse generator periodically raises the potential of the junction point between resistors 19 and 20 so that the flip-flop amplifier 1 will respond at a lower value of voltage U and will then produce a pulsating output signal which causes the lamp $L_1$ to flicker while the bistable flip-flop 6 will not respond.

The limit sensor device denoted by $G_n$ exemplifies an embodiment of an indicator for exhibiting the occurrence of a temperature minimum value at the output of the bistable flip-flop state 6. This device operates to cause a lamp $L_n$ to start flickering shortly before the minimum value of temperature is reached. The circuitry of the device $G_n$ is substantially identical with that of the device $G_1$ described above, with the only exception that the difference between the voltages U and $U_o$ are impressed upon the amplifier 1 in the reverse effective directions. That is, the amplifier input polarities are simply reversed as compared with those in the device $G_1$.

The embodiment of the invention illustrated in FIG. 3 is especially designed for the tolerance testing of workpieces as products in series or mass production. It permits the sensing of two limit values with the aid of a single sensing member and to ascertain at a glance whether a gauged magnitude is within the tolerance range, above that range, or below that range. The flip-flop amplifier 1 employed as measuring component is supplied with input magnitudes fundamentally in the same manner as in the device according to FIG. 1, the measuring quantity U being taken from a device 23 which converts the interesting physical quantity of a test specimen 24 to an analog voltage or current value. For example, when testing a specimen for electrical resistance, the intensity of the electric current flowing through the specimen may thus be taken as a measure of the resistance value. Three indicator lamps L+, L− and $L_t$ are connected through jointly operable contacts of a testing key 25 directly with the output of the flip-flop amplifier 1 and also through an inverter stage 26 with the same output of the amplifier 1. They are further connected through the same key contacts to the output of an OR gate 27 which has two inputs connected to the respective outputs of an AND gate 28 and a NOR gate 29. Each of the latter two gates has two inputs connected respectively with the output of the pulse generator 2 and with the output of the flip-flop amplifier 1.

The device operates as follows: if the voltage U, characteristic of the specimen 24, is below the tolerance range determined by the limits $U_o$ and $U_o - \Delta$, depression of the key 25 will cause the lamp $L_t$ to flicker, and the lamp L− to be continuously lit. If the characteristic voltage value U is within the above-mentioned tolerance range, the lamp $L_t$ is continuously lit, whereas both lamps L− and L+ will flicker. When the voltage U is above the tolerance range, the lamp L+ will be lit continuously, but the lamp $L_t$ will flicker. It is, of course, possible to also indicate these criteria with the aid of logic circuit components in dependence upon given signal conditions, for example with the aid of network devices analogous to those described above with reference to FIGS. 1 and 2.

FIG. 4 illustrates in detail the internal circuitry of a dynamic AND gate as shown at 12 in FIGS. 1 and 2, it being understood that the particular circuit shown is only one of the available possibilities of obtaining the desired timing performance. The circuit chosen for illustration comprises a series connection of two resistors 31 and 32 whose junction point 33 is connected to the output terminal 34 through a diode 35, and to the trigger input 15 through a capacitor 36. The terminal denoted by N in FIG. 4 is to be connected to a negative voltage.

When no signal appears at the input 15, the point 33 is at such a high negative potential that a positive voltage pulse at the trigger input 16 remains incapable of overcoming the blocking effect of the diode 35. Only after a voltage applied to the input 15 has resulted in a sufficient charge of capacitor 36 to raise the potential at point 33 to a smaller negative value, can a positive voltage jump temporarily pass through the diode 35 and appear as a positive signal pulse.

Dynamic gates are commercially available as standard components (German Standard DIN 40700, Sheet 14, No. 2.3). The components illustrated by the other gate and amplifier symbols are likewise obtainable as commercial components. Relative to suitable direct-current differential amplifiers, reference may also be had, if desired, to the German published patent application No. 1,074,087, published Jan. 28, 1960.

To those skilled in the art it will be obvious upon a study of this disclosure that our invention permits of various modifications and may be given embodiments other than those particularly illustrated and described herein, without departing from the essential features of our invention and within the scope of the claims annexed hereto.

We claim:

1. Sensor device for response to two limit values of an electrical voltage or current indicative of a variable physical quantity, comprising a flip-flop amplifier having input means and output means, sensing means providing an electrical quantity to be responded to and being connected to said amplifier input, a source of an additional electrical input quantity connected to said amplifier input and having a periodic pulse characteristic with given respective durations of pulses and pauses, and a coincidence gate network having respective input means connected to said amplifier output and to said periodic pulse source, said gate network having an output voltage dependent upon the switching of said flip-flop amplifier to its operating state during the pulses and pauses of said periodic additional input quantity, whereby said gate output voltage is indicative of whether said variable quantity has attained either of said limit values, said amplifier measures both limit values and the amplifier output is differentially scanned during the pulses and pauses.

2. In a device according to claim 1, said source being a pulse generator having an output pulse voltage connected to said input means of said gate network and to said amplifier input, and adjustable resistance means connected between said pulse generator and said amplifier input.

3. In a device according to claim 2, said gate network comprising an inverter and an AND gate, said AND gate having two inputs of which one is connected through said inverter to said pulse generator output, said other input of said AND gate being connected to the output of said flip-flop amplifier.

4. In a device according to claim 2, said gate network comprising a dynamic AND gate having a preparatory input and a trigger input of which the former is connected to the output of said flip-flop amplifier, the trigger input input being connected to the output of said pulse generator.

5. In a device according to claim 1, said sensing means comprising a bridge network having a branch provided with a temperature-responsive resistor and having a bridge output voltage varying in dependence upon the temperature of said resistor, said bridge output voltage being connected to said amplifier input to serve as said electrical quantity, and a decoupling diode interposed between said amplifier input and said periodic pulse source.

6. Device according to claim 1, for tolerance gauging, comprising three indicator lamps of which one is directly connected to the output of said flip-flop amplifier, an inverter stage through which a second one of said lamps is connected to said amplifier output, an OR gate having two inputs and having an output to which said third lamp is connected, an AND gate and a NOR gate having respective outputs connected to said two inputs of said OR gate, each of said AND gate and said NOR gate having an input connected to said amplifier output and an input connected to said pulse source.

7. System for supervising several variable physical quantities, comprising a number of sensor devices according to claim 1 for said physical quantities respectively, said source of periodic pulses of all of said devices being constituted by a single pulse generator which is connected to said amplifier and said gate network of each of said individual devices.

8. In a system according to claim 7, said pulse generator having a flicker-light frequency, and flicker lamps being connected to the outputs of said amplifiers in said respective devices.